United States Patent [19]
Dorninger

[11] Patent Number: 5,505,058
[45] Date of Patent: Apr. 9, 1996

[54] APPARATUS FOR COOLING PLASTIC PROFILES

[75] Inventor: Frank P. Dorninger, Micheldorf, Austria

[73] Assignee: Technoplast Kunststofftechnik Gesellschaft m.b.H., Micheldorf, Austria

[21] Appl. No.: 362,765

[22] Filed: Dec. 22, 1994

[30] Foreign Application Priority Data

Dec. 23, 1993 [AT] Austria ................................ 2617/93

[51] Int. Cl.⁶ .................................................. F25B 17/02
[52] U.S. Cl. ............................................. 62/374; 62/63
[58] Field of Search ................................. 62/63, 374

[56] References Cited

U.S. PATENT DOCUMENTS

| | | | |
|---|---|---|---|
| 3,169,272 | 2/1965 | Maxson | 18/14 |
| 3,990,257 | 11/1976 | Taylor et al. | 62/63 |
| 4,000,625 | 1/1977 | Beerens et al. | 62/63 |
| 4,212,171 | 7/1980 | Soecknick | 62/63 |

FOREIGN PATENT DOCUMENTS

| | | |
|---|---|---|
| 1923490 | 11/1970 | Germany. |
| 86081 | 11/1971 | Germany. |
| 2239746 | 2/1974 | Germany. |
| WO91/04147 | 4/1991 | WIPO. |

OTHER PUBLICATIONS

P. Berger u. A. Kramer, "Kalibrieren von Rohren bei hohen Abzugsgeschwindigkeiten," Kunststoffe, Bd. 65, Nr. 1, 1975.

Database WPI, "UKR Rubber Plastics," Derwent Publications Ltd., London, GB, (Nov. 9, 1988).

*Primary Examiner*—Ronald C. Capossela
*Attorney, Agent, or Firm*—Berne S. Broadbent; Gary D. E. Pierce; A. John Pate

[57] ABSTRACT

The invention relates to an apparatus for cooling plastic profiles, comprising: a trough for receiving a cooling medium through which the profile can be guided; at least one inflow opening for delivering cooling water into said trough; at least one outflow opening for leeding cooling water out of said trough; a device arranged as a self-sucking water pump for producing a pressure below atmospheric in said trough whose suction nozzle is in connection with the outflow opening for cooling water.

8 Claims, 2 Drawing Sheets

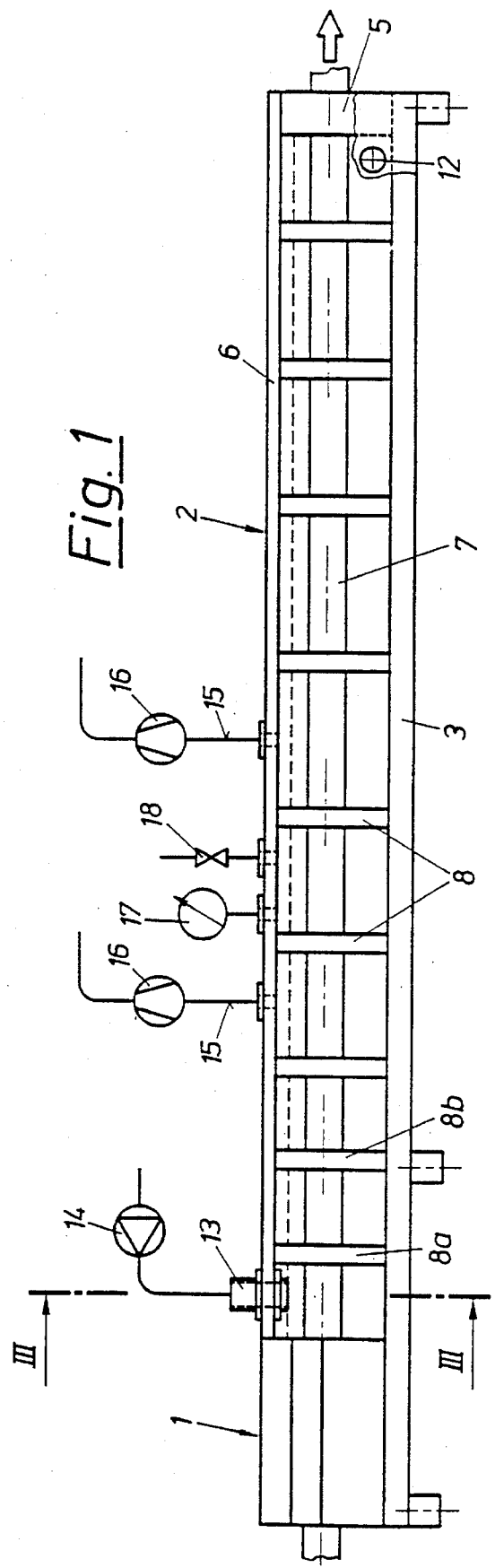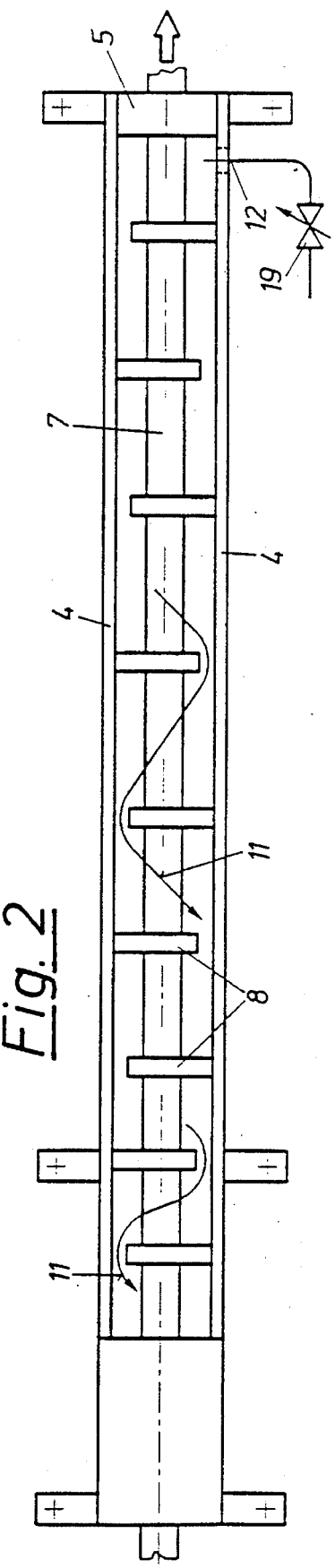

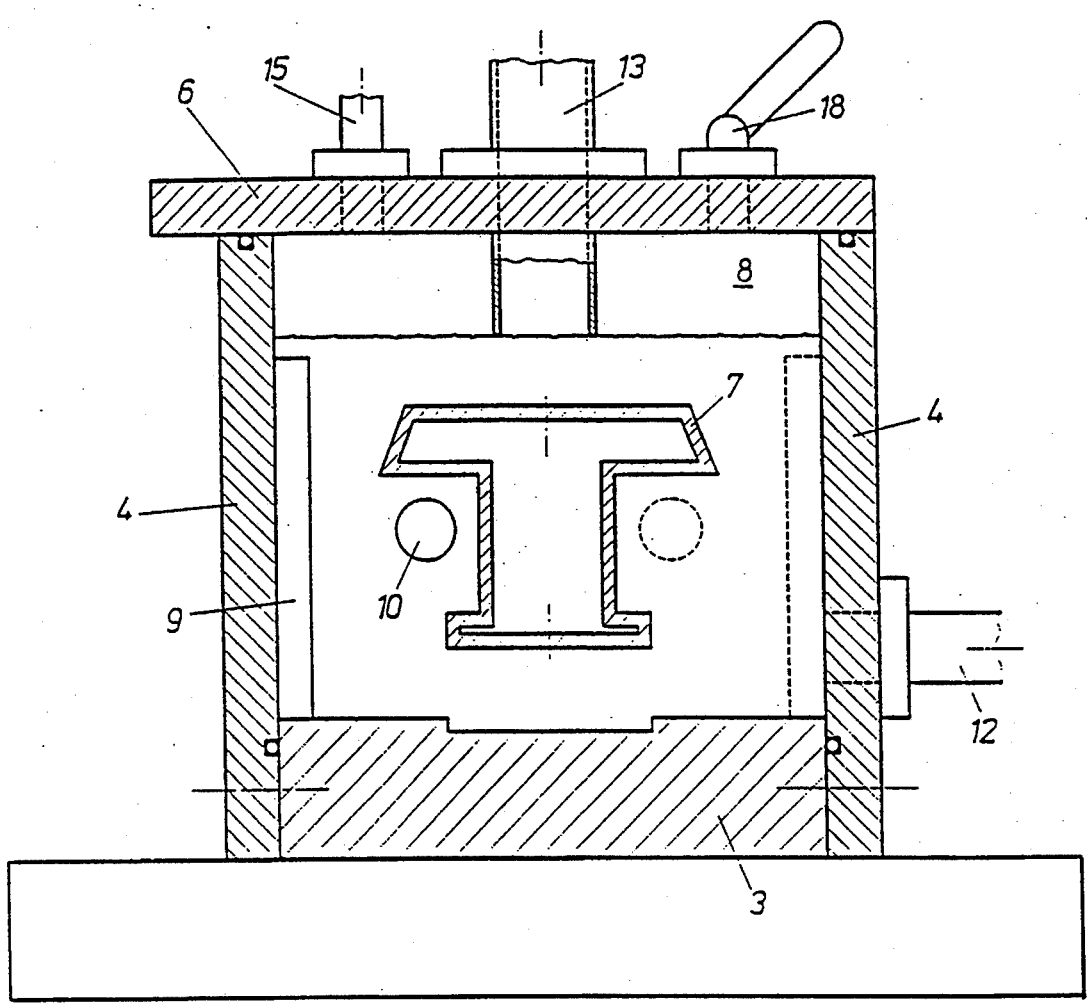

APPARATUS FOR COOLING PLASTIC PROFILES

BACKGROUND OF THE INVENTION

1. Field of the Invention

The invention relates to an apparatus for cooling plastic profiles, with a trough for receiving a cooling medium through which the profile can be guided and with several guiding means for calibrating the profile as well as with at least one inflow opening and with at least one outflow opening for the cooling water.

Plastic profiles are required as frame elements for windows or doors, for example. During their production, a plastic mass such as PVC is extruded at first through an opening corresponding to the profile. Immediately after the extrusion the profile has a doughy consistency. After the extruder an apparatus for dry calibration is usually provided, in which a first cooling and form stabilization is made. A further cooling process follows thereafter by means of a cooling medium, which is generally water, so as to carry off the heat from the inner regions of the profile. The invention relates in particular to such an apparatus for wet calibration.

2. Prior Art

There are known apparatuses of generally two types. A particularly efficient cooling is possible by the so-called spray bath. In this method the profile is guided through a trough which is equipped with a plurality of spray nozzles which are directed against the profile. Such an apparatus is very efficient, as the water jets hit the profile at high speed, thus ensuring favourable heat transmission. Moreover, in such an apparatus it is possible, by providing a favorable arrangement of the nozzles at sections of the profile which are difficult to cool such as re-entering angles or material accumulations, to cool at an increased level.

The spray bath is usually realized in a closed trough which is slightly evacuated during the operation. As in any case, atmospheric pressure prevails in the interior of the hollow profile, the vacuum causes the profile to sit close to the guiding means arranged at intervals within the trough and, thus, to be calibrated precisely. The vacuum is approximately between 0.1 to 0.3 bar and is produced by vacuum pumps which suck off air from the upper side of the trough.

The disadvantage in such a spray bath apparatus is the high consumption of water and the sensitivity of the nozzles. To achieve the optimal effect of such a spray bath, it is necessary to use nozzles of extremely small diameter. A feeding thereof with fresh water is generally not possible owing to the high water consumption. In the event that the water is recycled, however, extraordinary measures are required for water preparation. Despite these measures, blockages of the nozzles may occur, which may lead to deficient cooling of the profiles and the production of rejects.

The other known wet cooling system is the so-called full bath. In known apparatuses of this kind, the profile is guided through an upwardly open trough which is filled with a cooling medium such as water. In this system the supply of water is only required to the extent as is needed to regulate the temperature of the bath. Apparatuses according to said full bath principle are simple, easy to handle and consume little water.

However, until now it was not possible in a satisfactory manner to produce a pressure below atmospheric, similar to the spray bath, in the full bath. In addition to certain control-related problems, the formation of shock waves occur in certain operating conditions which lead to disadvantageous effects. This may reach right up to the destruction of the apparatus. Therefore, the quality of the calibration in known apparatuses according to the full bath principle is limited.

SUMMARY OF THE INVENTION

It is the object of the present invention to improve an apparatus of the kind mentioned above which operates according to the full bath principle in such a way that the efficiency is increased and an improved calibration is made possible. In this respect, the substantial advantages of the full bath, namely simplicity and economy, are to be maintained to a substantial extent.

In accordance with the invention, this is achieved in that a device for producing a pressure below atmospheric is provided in the trough which is arranged as a self-sucking water pump whose suction nozzle is in connection with the outflow opening for cooling water.

In this way, it is possible in a surprising manner to produce within the trough of a full bath a pressure below atmospheric without having to encounter the above-mentioned problems. Furthermore, in the production of the vacuum via the water pumps considerable savings in energy occur as the output of the water pump is in the best of all cases less than half the output of vacuum pumps in known apparatuses. In addition, however, it is also possible to provide vacuum pumps for sucking off air. These, however, are only used for support and regulation and for removing air which has entered the trough.

A preferably controllable throttle apparatus is advantageously provided in the region of the inflow opening. In this way a regulation of the throughput of the cooling medium and a simultaneous influence on the vacuum are enabled.

The guiding means subdivide the trough into a plurality of sections which are arranged successively in the axial direction of the profile. The substantial element in the invention, however, is that openings are provided which allow a flow of the cooling medium from one section to the next. As a result of the forced circulation of the cooling medium, turbulences are produced in the region of said openings which continue to the adjacent sections. In this way it is possible to achieve a heat transmission between profile and cooling medium which is comparable to that of spray bath systems.

It is particularly favorable if the openings of two mutually adjacent separating walls are arranged in a mutually offset manner. In this way, a global flow of the cooling medium transversal or inclined to the axis of the profile is produced which further improves the heat transmission.

In a particularly preferred embodiment of the invention, a part of the openings is arranged in the region of surface sections of the profile which are to be cooled especially. As a result of this measure, profile sections that are difficult to cool such as re-entering angles, concave sections or accumulations of mass are cooled especially by being subjected to regions of the highest turbulence. In this way, it is possible to ensure a particularly even cooling of the profile, which is important for preventing tensions and for increasing accuracy to size.

It may further be provided that an inflow opening is arranged in the region of an opening of the trough through which the profile exits and that an outflow opening is arranged in the region of an opening of the trough through which the profile enters the trough. In this way the profile and the cooling medium are guided in a counter-current, thus optimizing the heat transmission. It is, however, also possible within the scope of the invention to arrange successively two or several mutually complete, separated cooling sections which are each provided with a separate inflow opening and outflow opening. Such cooling sections are separated from one another by separating walls without openings.

SHORT DESCRIPTION OF THE DRAWINGS

FIG. 1 is a side view of an apparatus in accordance with the invention;

FIG. 2 is a top view of the apparatus of FIG. 1;

FIG. 3 is a section along line III—III of FIG. 1 on an enlarged scale.

DESCRIPTION OF THE PREFERRED EMBODIMENTS

The apparatus of FIG. 1 consists of a dry calibrating device 1 and a wet calibrating device 2. The wet calibrating device 2 consists of a trough which consists of a base plate 3 and side walls 4 as well as an end plate 5. Trough 2 is upwardly covered by a cover plate 6. The profile 7 exiting from the dry calibrating device 1 enters the trough directly and leaves it again through end plate 5 at the other end. Several guiding means 8 are provided within the trough which are used for calibrating profile 7.

FIG. 3 shows the arrangement of the apparatus in accordance with the invention in a cross-sectional view. Guiding means 8 enclose the profile 7 and fill the cross section of the trough nearly completely which is limited by base plate 3, side walls 4 and cover plate 6. In the example shown in FIG. 3, only openings 9 and 10 remain free, which enable the exchange of liquid between the sections 11a and 11b of the trough which are separated by the separating wall 8a. Opening 9 is arranged as a slot in the zone of one side wall 4 of the trough. The opening 10 is provided circular in the region of a concave profile section so to as increase the cooling here.

Within the scope of the invention, it is possible to provide different openings 9 and 10 in the same separating wall 8a, as is shown in FIG. 3. It is, however, also possible to provide a part of the separating walls with longitudinal openings 9 and to provide another part of the separating walls with openings 10 in the region of profile 7. In any case it is favorable to arrange the openings 9, 10 of two adjacent separating walls 8a, 8b in a mutually offset manner, as is indicated in the broken line in FIG. 3 and as is also shown in FIG. 2. Arrows 11 in FIG. 2 indicate the main path of flow of the cooling medium. In the zone of end plate 5 there is provided an inflow opening 12 for the cooling water. The outflow opening 13 in the region of entrance of profile 7 is connected to a self-sucking water pump 14. It conveys the water into a storage container, which is not shown, or into a drain. As no sensitive nozzles are provided in the apparatus in accordance with the invention, a partial flow of the water that has been sucked off can be returned. Fresh water is supplied to the extent as is required for regulating the temperature of the water bath.

In order to prevent an excessive drop of the water level in the apparatus, several suctions 15 are provided which are connected to a vacuum pump 16. The pressure in the interior of the system can be checked with a gauge 17. A ball valve 18 allows for regulating the pressure below atmospheric by hand. A throttle valve 19 is provided at the inflow opening 12, with which the pressure below atmospheric and the volume flow of the cooling medium can be influenced.

I claim:

1. An apparatus for cooling plastic profiles, comprising:
   a trough for receiving a cooling medium, said trough including an opening through which the profile can be guided;
   at least one inflow opening for delivering said cooling medium into said trough;
   at least one outflow opening for removing said cooling medium out of said trough, said outflow opening disposed substantially adjacent said opening of the trough;
   a vacuum pump for producing a pressure below atmospheric in said trough; said vacuum pump having at least one suction nozzle disposed in connection with the outflow opening; and
   a controllable throttle apparatus for regulating the flow of said cooling medium, said throttle apparatus interacting with said inflow opening.

2. An apparatus of claim 1, further comprising additional vacuum pumps for suctioning air from the trough.

3. An apparatus according to claims 1 or 2, further comprising several guiding means arranged in said trough forming separating walls which subdivide the trough into several sections in the longitudinal direction of the profile with first openings for calibrating the profile, and with further openings for producing a turbulent flow of the cooling medium circulating between said inflow opening and said outflow opening.

4. An apparatus of claim 3, characterized in that the further openings of two adjacent separating walls are arranged in a mutually offset manner.

5. An apparatus of claim 3, characterized in that some of the further openings are arranged near surface sections of the profile to be cooled especially.

6. An apparatus of claim 3, characterized in that some of the further openings are arranged as recesses between the separating walls and the walls of the trough.

7. An apparatus of claim 3, characterized in that said inflow opening is arranged substantially adjacent an opening of the trough through which the profile exits.

8. An apparatus of claim 1, characterized in that said inflow opening is arranged substantially adjacent an opening of the trough through which the profile exits.

* * * * *

UNITED STATES PATENT AND TRADEMARK OFFICE
CERTIFICATE OF CORRECTION

PATENT NO.   :   5,505,058
DATED        :   April 9, 1996
INVENTOR(S)  :   Frank P. Dorninger It is certified that error appears in the above-identified patent and that said Letters Patent is hereby corrected as shown below:

In column 1, line 19, after "extruder", please insert -- , --.
In column 1, line 32, please delete "favourable", and insert therefor -- favorable --.
In column 4, line 49, please delete "claim 3", and insert therefor -- claim 1 --.
In column 4, line 52, please delete "claim 1", and insert therefor -- claim 3 --.

Signed and Sealed this

Fifteenth Day of October, 1996

Attest:

BRUCE LEHMAN

*Attesting Officer*            *Commissioner of Patents and Trademarks*